(12) United States Patent
Holtz et al.

(10) Patent No.: US 8,554,889 B2
(45) Date of Patent: Oct. 8, 2013

(54) METHOD, SYSTEM AND APPARATUS FOR MANAGING COMPUTER IDENTITY

(75) Inventors: Eric Holtz, Kirkland, WA (US); David James, Bothell, WA (US); Michael Healy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1643 days.

(21) Appl. No.: 10/926,686

(22) Filed: Aug. 26, 2004

(65) Prior Publication Data

US 2005/0256973 A1    Nov. 17, 2005

Related U.S. Application Data

(60) Provisional application No. 60/564,069, filed on Apr. 21, 2004.

(51) Int. Cl.
    *G06F 15/173* (2006.01)
    *G06F 15/16* (2006.01)

(52) U.S. Cl.
    USPC .......................................... 709/223; 709/245

(58) Field of Classification Search
    USPC .................................................. 709/223, 245
    See application file for complete search history.

(56) References Cited

U.S. PATENT DOCUMENTS

| | | | |
|---|---|---|---|
| 5,588,119 A | | 12/1996 | Vincent et al. |
| 5,724,510 A | * | 3/1998 | Arndt et al. ................... 709/220 |
| 5,757,924 A | * | 5/1998 | Friedman et al. ............. 713/151 |
| 5,974,453 A | * | 10/1999 | Andersen et al. ............. 709/220 |
| 6,055,574 A | * | 4/2000 | Smorodinsky et al. ........ 709/226 |
| 6,185,184 B1 | * | 2/2001 | Mattaway et al. ............. 370/230 |
| 6,360,334 B1 | * | 3/2002 | Kavanagh et al. .......... 714/38.13 |
| 6,466,986 B1 | * | 10/2002 | Sawyer et al. ................ 709/245 |
| 6,684,243 B1 | * | 1/2004 | Euget et al. ................... 709/222 |
| 6,691,170 B1 | * | 2/2004 | Gitlin et al. ................... 709/245 |
| 6,782,350 B1 | * | 8/2004 | Burnley et al. ............... 702/186 |
| 6,854,072 B1 | * | 2/2005 | Cagle et al. ..................... 714/15 |
| 6,862,286 B1 | * | 3/2005 | Tams et al. .................... 370/401 |
| 6,963,909 B1 | * | 11/2005 | Huey et al. .................... 709/222 |
| 6,996,085 B2 | * | 2/2006 | Travostino et al. ........... 370/338 |
| 7,068,597 B1 | * | 6/2006 | Fijolek et al. ................. 370/230 |
| 7,068,654 B1 | * | 6/2006 | Joseph et al. ................. 370/392 |
| 7,073,197 B2 | * | 7/2006 | Rabin et al. ..................... 726/18 |
| 7,107,326 B1 | * | 9/2006 | Fijolek et al. ................. 709/220 |
| 7,127,524 B1 | * | 10/2006 | Renda et al. .................. 709/245 |
| 7,188,170 B1 | * | 3/2007 | Burnley et al. ............... 709/224 |

(Continued)

FOREIGN PATENT DOCUMENTS

| | | |
|---|---|---|
| GB | 2 361 141 A | 10/2001 |
| GB | 2 362 060 A | 11/2001 |

(Continued)

*Primary Examiner* — Thuong (Tina) Nguyen
*Assistant Examiner* — Tariq Najee-Ullah
(74) *Attorney, Agent, or Firm* — Workman Nydegger

(57) ABSTRACT

Embodiments of the present invention provide the ability to accurately match a particular computing device within a networked computing environment with an identity of that computing device. According to one aspect, a method for identifying a client computing device in a networked computing environment is provided. The method receives a discovery data record that includes a hardware identification and a logical identification, and in response, queries a plurality of client records for a matching client record. If a matching client record is identified by the query it is compared with the received discovery data record to identify the client computing device.

34 Claims, 5 Drawing Sheets

(56) References Cited

U.S. PATENT DOCUMENTS

| | | | |
|---|---|---|---|
| 7,218,739 B2* | 5/2007 | Multerer et al. | 380/251 |
| 7,240,364 B1* | 7/2007 | Branscomb et al. | 726/9 |
| 7,246,228 B2* | 7/2007 | Sato et al. | 713/100 |
| 2002/0013856 A1* | 1/2002 | Garcia-Luna-Aceves et al. | 709/238 |
| 2002/0032855 A1* | 3/2002 | Neves et al. | 713/154 |
| 2002/0087873 A1* | 7/2002 | Zunke | 713/193 |
| 2002/0126846 A1* | 9/2002 | Multerer et al. | 380/251 |
| 2003/0097422 A1* | 5/2003 | Richards et al. | 709/217 |
| 2003/0169713 A1* | 9/2003 | Luo | 370/338 |
| 2004/0024860 A1* | 2/2004 | Sato et al. | 709/223 |
| 2004/0199621 A1* | 10/2004 | Lau | 709/223 |
| 2005/0005026 A1* | 1/2005 | Brown et al. | 709/245 |
| 2005/0005098 A1* | 1/2005 | Michaelis et al. | 713/156 |
| 2005/0010695 A1* | 1/2005 | Coward et al. | 709/253 |
| 2005/0050161 A1* | 3/2005 | Arnold et al. | 709/217 |
| 2005/0068565 A1* | 3/2005 | Maeda | 358/1.15 |
| 2005/0145688 A1* | 7/2005 | Milenkovic et al. | 235/375 |
| 2005/0198267 A1* | 9/2005 | Parks et al. | 709/224 |
| 2006/0101375 A1* | 5/2006 | Loughlin et al. | 717/104 |

FOREIGN PATENT DOCUMENTS

| | | |
|---|---|---|
| JP | 2000035950 | 2/2000 |
| JP | 2002123396 | 4/2002 |
| JP | 2002132584 | 5/2002 |
| JP | 2002217888 | 8/2002 |
| JP | 2002351565 | 12/2002 |
| JP | 2002369972 | 12/2002 |
| JP | 2004110081 | 4/2004 |

* cited by examiner

METHOD, SYSTEM AND APPARATUS FOR MANAGING COMPUTER IDENTITY

CROSS-REFERENCE TO RELATED APPLICATION

This application claims the benefit of U.S. Provisional Application No. 60/564,069, filed Apr. 21, 2004, entitled "System and Method for Managing Computer Identity in an Asset Management Application," which is incorporated by reference herein.

FIELD OF THE INVENTION

In general, the present invention relates to computer management, and in particular, to a system, method, and apparatus for managing, confirming, and updating the identity of computing devices in a networked computing environment.

BACKGROUND

Advancements in computing devices, computer networks, computing software, and network applications has increased the variety and complexity in which computing devices are networked and deployed in a networked computing environment. For example, a company may often deploy a large number of computers that are managed by an information services department. In addition to computing devices being managed in a networked computing environment, the applications and hardware of those computers may also be managed. Management of a computer, the computer's hardware, and the applications or software located on that computer, is referred to herein as "asset management."

In order to adequately perform computer asset management, computers located within a networked computing environment must be identifiable. In short, when information is sent or received from a particular computer, the computer transmitting the information needs to be accurately matched with an identity for that computer. To provide complete functionality, the process of matching computers with identities needs to meet five requirements. First, a computer should uniquely and consistently match a single identity. Second, the process should be impervious to certain changes in the physical or logical configuration of the computers. Third, the process should not rely on user intervention during configuration changes to maintain the identity of the computer. Fourth, the process should allow for a new identity to be generated such that an unchanged computer can be assigned to a new identity. Fifth, when a new identity of a computer is generated, the previous identity for that computer should be identifiable as no longer belonging to the computer (i.e. obsolete) and the new identity should be easily associated with the computer.

Typical techniques of identifying computers may satisfy one or more of those requirements, but are incapable of satisfying all five and thus, cannot provide complete functionality. One typical technique for identifying computers within a networked computing environment assigns a logical identification for each computer as that computer's identity. That logical identification is used to identify the computer. However, logical identifications for computers may be copied and a second computer may access the network using a false identity. Allowing computers with copied identities to access the network results in potential security problems and also results in inaccurate computer asset management. In addition, a physical or logical configuration change of the computer associated with that logical identity may result in the asset management application not being able to match the logical identification with the computer. Still further, when configuration changes occur to the computer, user intervention is often required to ensure that the logical identity for that computer is not lost due to the configuration changes.

Another typical technique for identifying computers within a networked computing environment is through the use of a hardware identification. In such techniques, an item of hardware, such as a hard drive of the computer, is selected and an identifier of that hardware is used to identify the computer. However, hardware identification for a computer cannot be changed, thereby removing the ability to redeploy that computer under a new identity unless the hardware is also modified. Additionally, if the particular item of hardware from which the hardware identification was obtained is replaced or removed, the identity for that particular computer would be lost.

Thus, there is a need for a system, method, and apparatus for managing computers that accurately identifies the computer, allows changes to be made to the computer, and provides the ability to assign a new identity to that computer. Still further, a need exists for such a system that accomplishes those objectives without user intervention.

SUMMARY

Embodiments of the present invention provide the ability to accurately match a particular computing device within a networked computing environment with an identity of that computing device. According to one aspect, a method for identifying a client computing device in a networked computing environment is provided. The method receives a discovery data record that includes a hardware identification and a logical identification, and in response, queries a plurality of client records for a matching client record. If a matching client record is identified by the query it is compared with the received discovery data record to identify the client computing device.

According to another aspect, a method for generating a discovery data record for identifying a client computing device is provided. The method initiates by searching for an existing logical identification and hardware properties for a client computing device. If existing logical identification and hardware properties are located, the method determines if the located hardware properties are similar to existing hardware properties. If it is determined that the located hardware properties are similar to the existing hardware properties, a discovery data record including the located logical identification and a hardware identification is generated.

According to still another aspect, a computing device identity management system having a client computing device, a discovery data manager, and a communication path for transmitting information between the client computing device and the discovery data manager is provided. The computing device identity management system is configured to perform a method for identifying a client computing device. The method begins in response to receiving from the client computing device a discovery data record and determining if the discovery data record includes a logical identification. If the discovery data record does contain a logical identification, it is then determined if the logical identification matches a logical identification of a client record. If so, the client record is obtained. However, if the received discovery data record does not include a logical identification, key data from the discovery data record is compared with key data of the client records to identify a client record with matching key data. Utilizing the identified client record, the client computing device is identified.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Computing device identification is a core feature of any asset management application. Computing device asset management applications that cannot accurately identify computing devices within a networked computing environment suffer from inaccurate asset inventories and may be unable to reconcile the results of changes made to computing devices within the networked computing environment with the inventory of those networked computing devices. Embodiments of the present invention provide the ability to accurately match a particular computing device within a networked computing environment with an identity for that computing device. Information received from a computing device may be uniquely and consistently matched to a single identity and the process for matching the computing device with an identity is impervious to changes in the physical or logical configuration of the computing device. Additionally, embodiments of the present invention do not rely on user intervention during configuration changes of a computing device to maintain the accuracy of the identity of that computing device. Still further, a new identity may be generated for an unchanged computing device such that the computing device can be redeployed within a network under a new identity. Additionally, when a new identity of a computing device is generated, the previous identity for that computing device is identifiable as no longer belonging to the computing device and the new identity may be easily associated with the computing device.

While the discussion provided herein describes identification of computing devices in a networked computing environment, it will be understood that embodiments of the present invention may be utilized to identify any type of communication device that may be included in a network. Examples of a computing device include, but are not limited to, personal computers, desktop computers, mobile telephones, memory devices, servers, databases, and the like. Additionally, while the discussion provided herein is directed toward identifying computing devices for asset management, it will be appreciated by one of skill in the relevant art that identification of computing devices may be utilized with any type of networked application. For example, embodiments of the present invention may be utilized for identifying computing devices for a directory services application, in which identities of computing devices are maintained.

Figure 1:
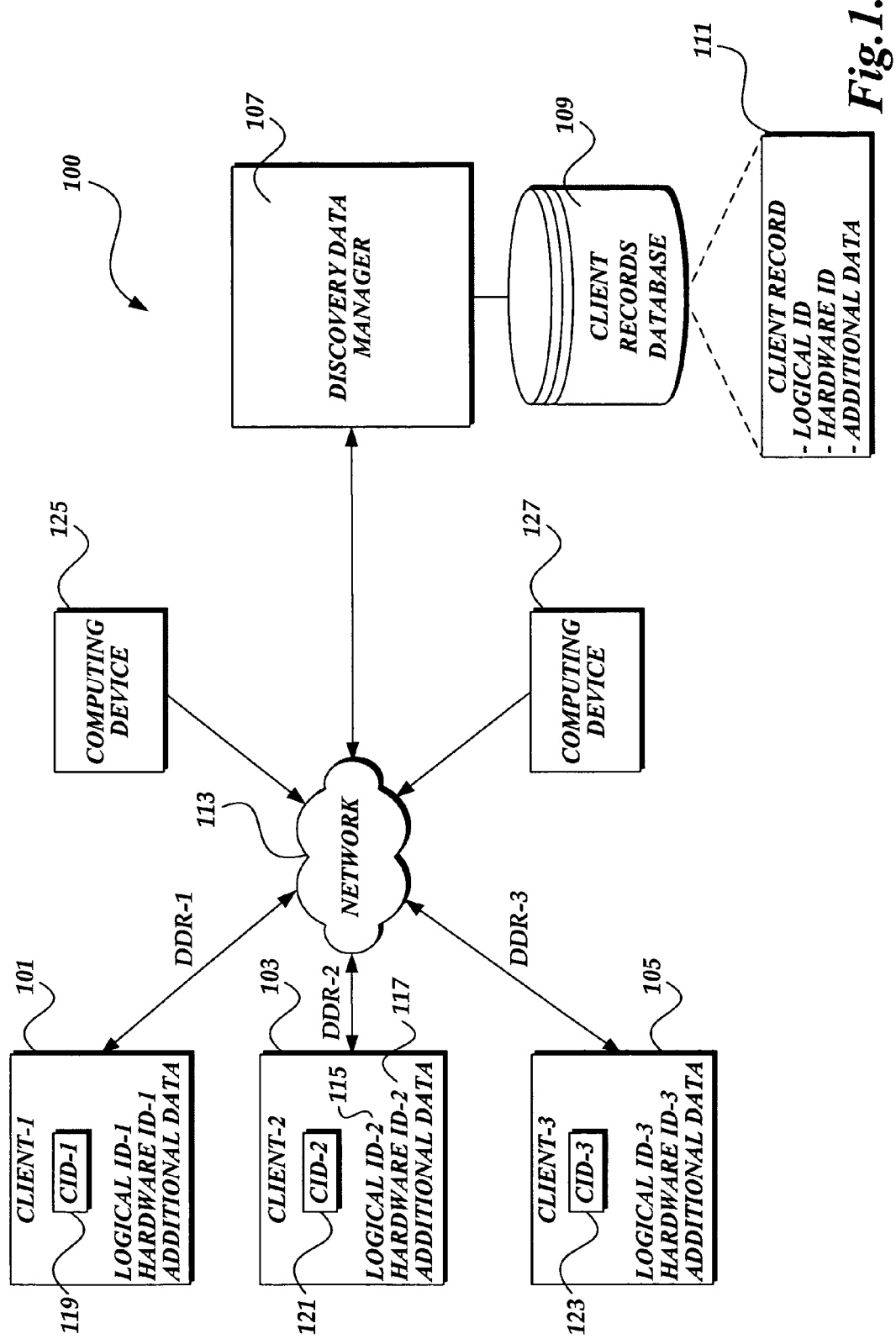
FIG. 1 is a block diagram of a networked computing environment in which computing devices are capable of being identified, in accordance with an embodiment of the present invention.

FIG. 1 is a block diagram of a networked computing environment in which computing devices are capable of being identified, in accordance with an embodiment of the present invention. In particular, FIG. 1 illustrates a networked computing environment 100 that includes a plurality of "client computing devices," such as client-1 101, client-2 103, and client-3 105, and "non-client computing devices," such as computing device 125 and computing device 127. A client computing device, as described herein is a computing device that includes a client identification device ("CID"), such as CID-1 119, CID-2 121, and CID-3 123. In an embodiment of the present invention, the CID may be implemented as a software program, a software subroutine, software element, etc. A non-client computer device, as described herein is a computing device that does not include a CID.

Each of the computing devices is connected to a network 113 and capable of communicating with a discovery data manager 107. The network 113 may be any type of network, such as an internet, the Internet, a Local Area Network ("LAN"), a Wide Area Network ("WAN"), etc. Additionally, the connection of each of the computing devices to the network 113 may be accomplished via any form of transmission. For example, a connection may be wireless, wired, or infrared.

The discovery data manager 107, which is also connected to the network 113, includes a client records database 109 that contains client records 111, identifying each of the client computing devices within the networked computing environment 100. The discovery data manager 107 may be any type of computing device that is capable of communicating with the network 113 and may include software for communicating with computing devices on the network 113. As will be appreciated by one skilled in the relevant art, there may be any number and combination of client computing devices and non-client computing devices within the networked computing environment 100 for which identification is necessary. Additionally, there may be no non-client computing devices within the networked computing environment 100. Computing devices are identified to the discovery data manager 107 as client computing devices via communication with a CID.

The CID, upon addition to a computing device within the networked computing environment 100, and at subsequent time intervals, generates and sends to the discovery data manager 107 a discovery data record, such as DDR-1, DDR-2, and DDR-3. The discovery data record includes a "logical ID" and a "hardware ID" both of which are used to accurately identify the computing device on which the CID is located. The logical ID is a randomly generated but unique value that is used to represent the logical identity of the client computing device. The hardware ID is a deterministically generated identifier based on various properties of the client computing device's hardware that is used to represent the physical identity of the client computing device.

The discovery data record is transmitted upon addition of a CID to a computing device located within the networked computing environment 100 and at subsequent time intervals in order to update the discovery data manager 107 as to the status of the client computing device. For example, a discovery data record may be generated by a CID and sent from a client computing device, such as client-2 103, once a week to the discovery data manager 107. Transmissions of a discovery data record at different points-in-time informs the discovery data manager that the client computing device is still active and in its current state within the networked computing environment 100.

Discovery data records may also be generated and transmitted to the discovery data manager 107 by devices other than a CID. For example, discovery data records may be received from query devices that query the networked computing environment 100 for computing devices that do not contain a CID and are thus not clients. Discovery data records that are generated by non-CIDs include general information about the computing devices within the networked computing environment. Such devices may be used for initial population of the client records database for computing devices within a networked computing environment. Additionally, such devices may be used to identify computing devices that are within the networked computing environment but are not clients of the discovery data manager.

The logical ID, such as logical ID-2 115 of client-2 103, is randomly generated by the CID and stored on the client computing device. That logical ID remains fixed as long as the CID determines that it is residing on the same client computing device. For example, transferring a disk image containing a CID from one computing device to another may cause the CID to generate a new logical identification. Additionally, a major hardware change to the client computing device may result in the CID of that client computing device generating a new logical identification.

Additionally, the logical identification may be changed by a user, by reinstalling an operating system on the client computing device, or if the saved logical identification becomes corrupted.

A hardware ID, such as hardware ID-2 117 of client-2 103, is selected to be as deterministic and as unique as possible. The hardware ID is always the same on a particular computing device, regardless of whether the client and/or the operating system is removed and reinstalled or whether the logical ID changes. The hardware ID may be, but is not limited to, the serial number on a Basic Input/Output System ("BIOS") of the client computing device, a Media Access Control address ("MAC address") of the client computing device, an asset tag, etc. In an alternative embodiment, the hardware ID may be created by a combination of hardware identifiers of the client computing device. For example, the system BIOS and the MAC address of the client computing device may be merged to create a hardware ID.

In addition to the discovery data record including a logical ID and a hardware ID, additional data about the client and the client computing device may also be included in the discovery data record. Additional data may include a version type of the client computing device, a type of the client computing device, an operating system type of the client computing device, a client computing device name, a list of hardware on the client computing device, a list of software on the client computing device, etc. Some of the additional data may also be considered "key data" that is used to further confirm the identity of the client computing device. In general, key data includes properties (such as hardware properties) that taken individually could each have a high likelihood of uniquely identifying a computer. For example, key data may include, but is not limited to, the CID name, the client computing device name, and the client identifier bit.

The discovery data manager 107 manages the identity of all clients on the networked computing environment 100. In particular, the discovery data manager 107 processes received discovery data records, updates the discovery information for existing client records and creates new client records for newly added clients. A client record 111 includes the logical ID, hardware ID, and additional data that is sent from a client computing device in the form of a discovery data record. The client records are stored on a client records database 109 that is maintained by the discovery data manager 107. As will be appreciated by one of skill in the relevant art, the client records database may be any type of database, such as a relational database, a hypertext database, a flat-file database, etc.

Figure 2:
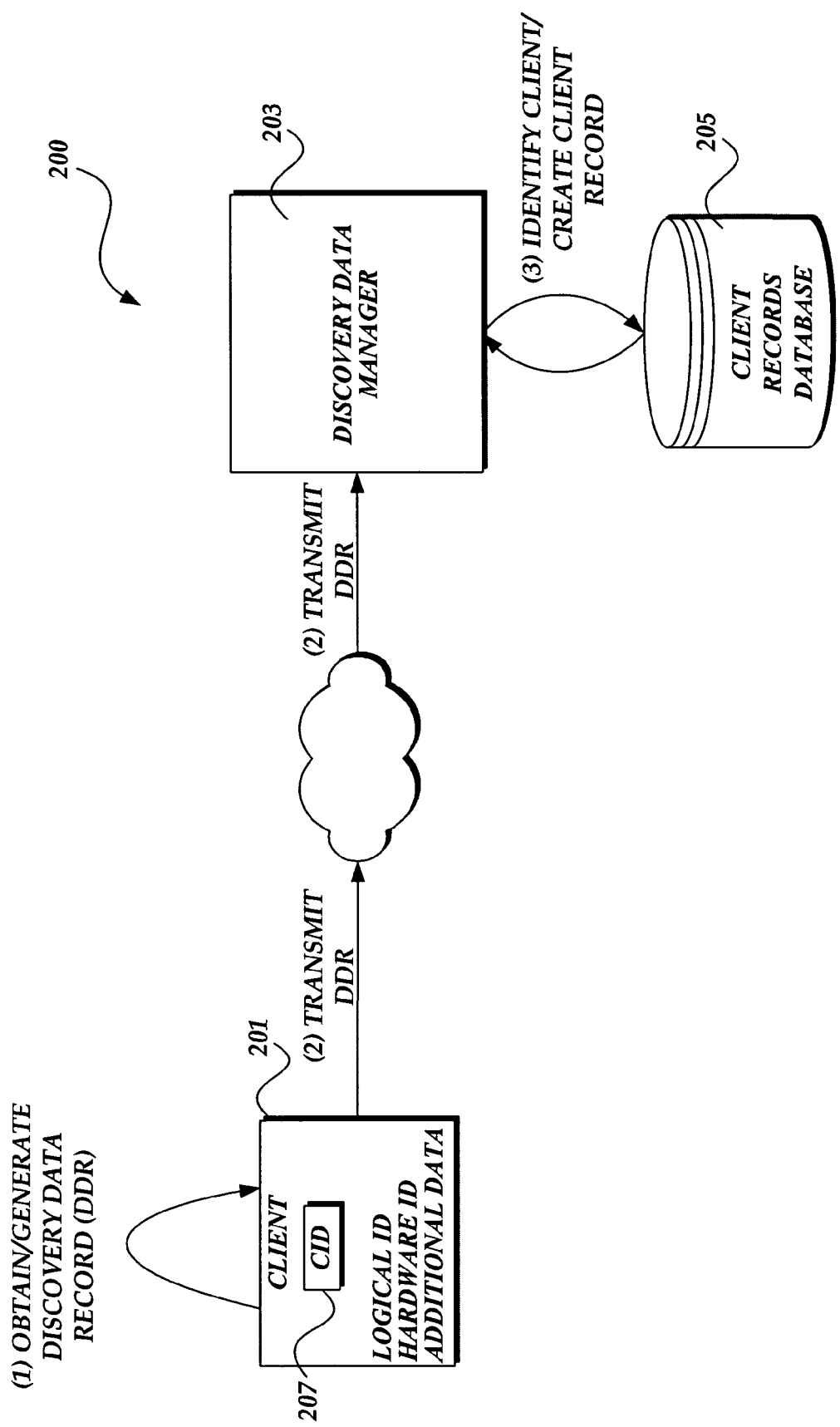
FIG. 2 is a block diagram illustrating a discovery data record submission and identification between a client computing device and a discovery data manager of a networked computing environment, in accordance with an embodiment of the present invention.

FIG. 2 is a block diagram illustrating a discovery data record submission and identification between a client computing device 201 and a discovery data manager 203 of a networked computing environment 200, in accordance with an embodiment of the present invention. As will be described in more detail below, the CID 207 on the client computing device 201 obtains and/or generates a discovery data record that is transmitted to the discovery data manager 203. For example, if a CID 207 is being added to the networked computing environment 200 for the first time, it will generate a discovery data record that includes a unique logical ID, a hardware ID, and additional data that identifies the client computing device 201. Alternatively, if the CID 207 and the client computing device 201 have been part of the networked computing environment 200 the CID 207 compiles and sends a discovery data record using the stored logical ID and stored hardware ID. This discovery data record is transmitted to the discovery data manager 203 for identification and status update purposes.

Upon transmission of a discovery data record from a client computing device 201 to the discovery data manager 203, the discovery data manager communicates with the client records database 205 to determine if the information contained in the received discovery data record matches a client record stored in the client records database 205. If a match is found, the client computing device 201 is identified as an existing client and the client records are updated if necessary. Once identified, the client computing device 201 may then be allowed to proceed to copy files and obtain other information from servers within the network, store information on servers within the network, etc. Additionally, identity of the client computing device 201 within the networked computing environment 200 allows the discovery data manager 203 to query the client computing device 201 and/or receive additional information from the client computing device 201 as to the status of that client and thereby maintain an accurate asset inventory for the client computing device 201.

For example, upon identification of the client computing device 201 the client computing device 201 may provide to the discovery data manager an identification of the hardware components located on client computing device 201, the software on client computing device 201, and other information about the client computing device 201 that is maintained by the discovery data manager 203 as part of its asset management routine. In an alternative embodiment, such information may be included as part of the additional data transmitted with the discovery data record.

Figure 3:
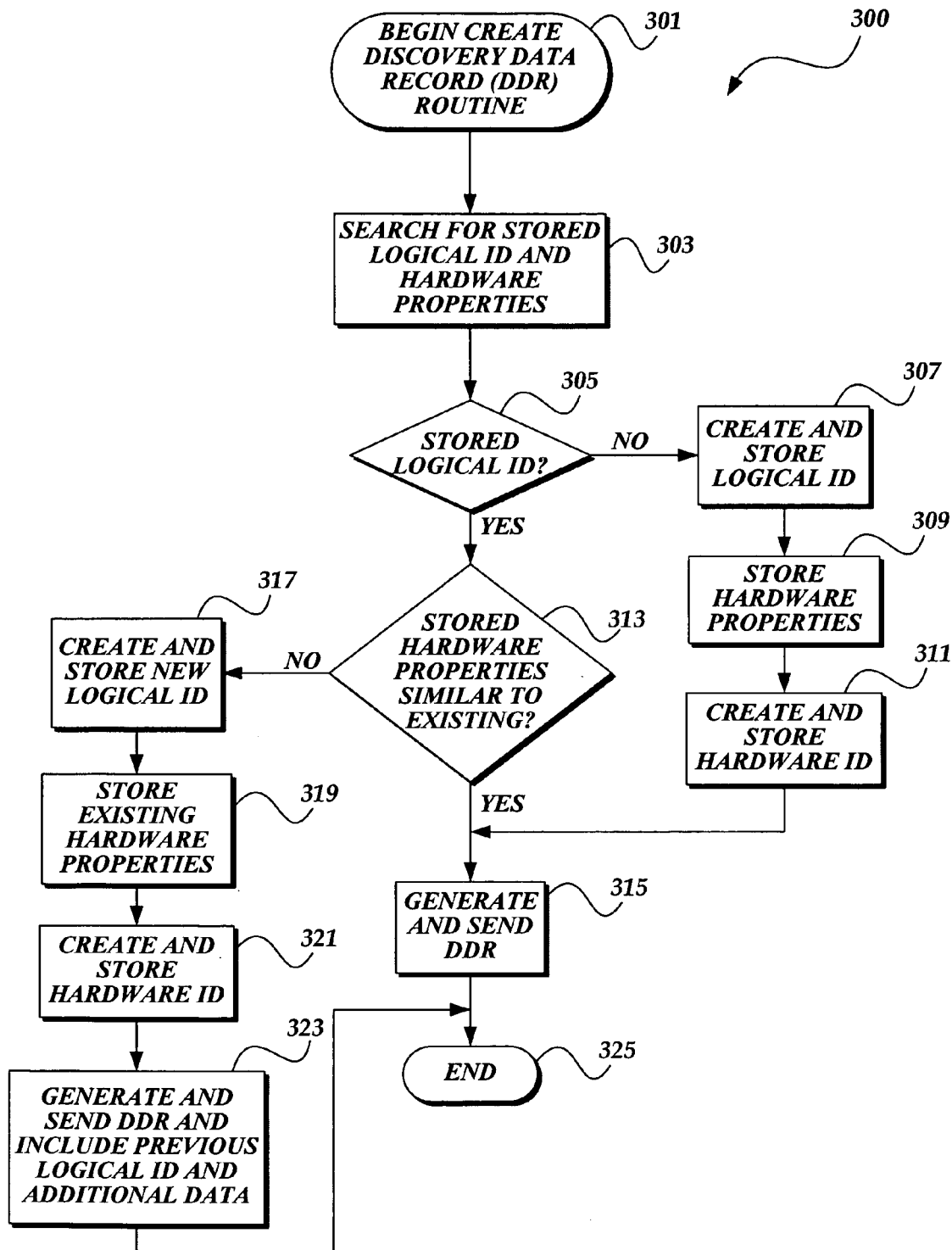
FIG. 3 is a flow diagram illustrating the process of creating a discovery data record, in accordance with an embodiment of the present invention.
Figure 4:
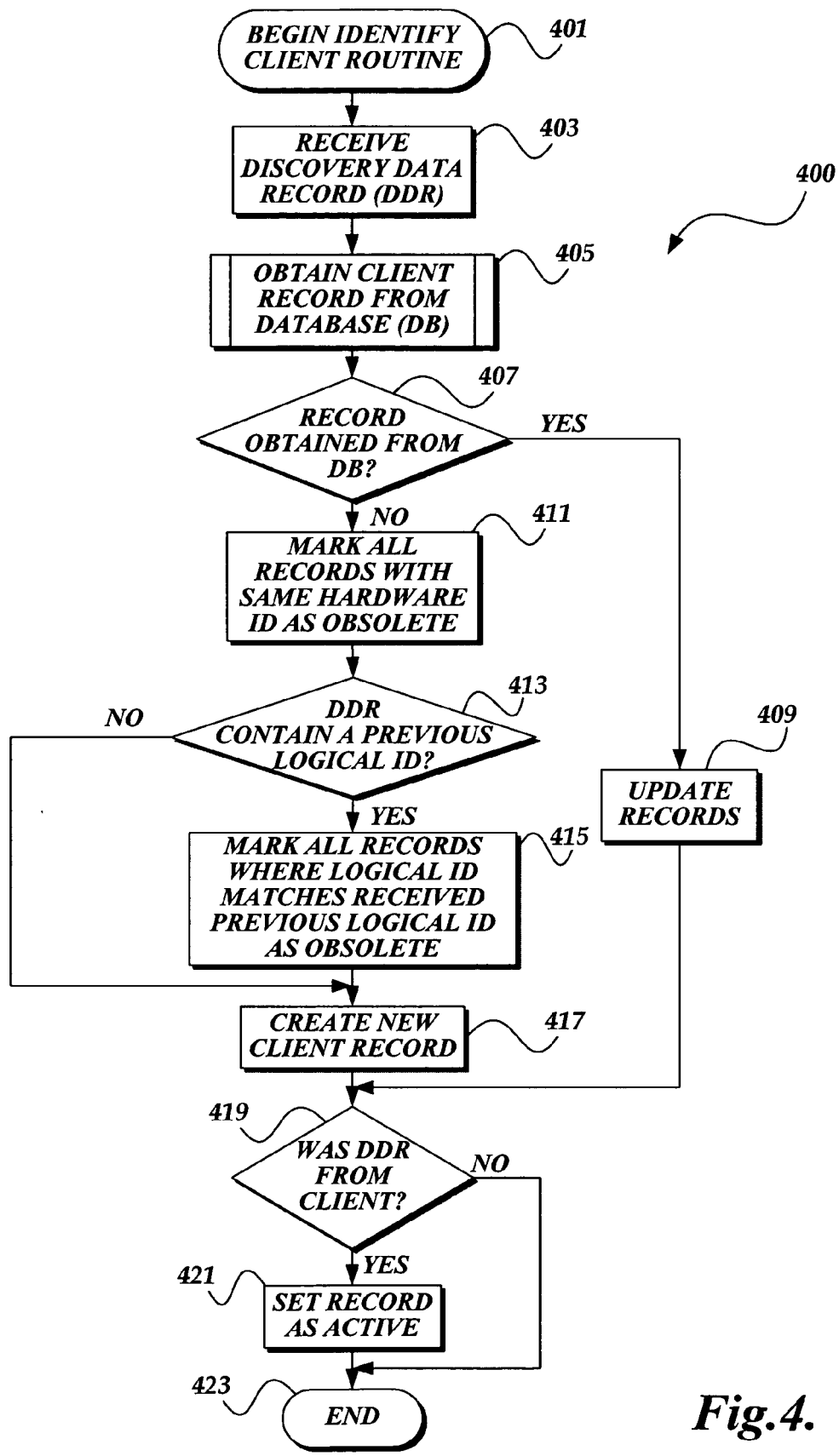
FIG. 4 is a block diagram illustrating an identify client computing device routine for accurately identifying a client computing device within a networked computing environment, in accordance with an embodiment of the present invention.
Figure 5:
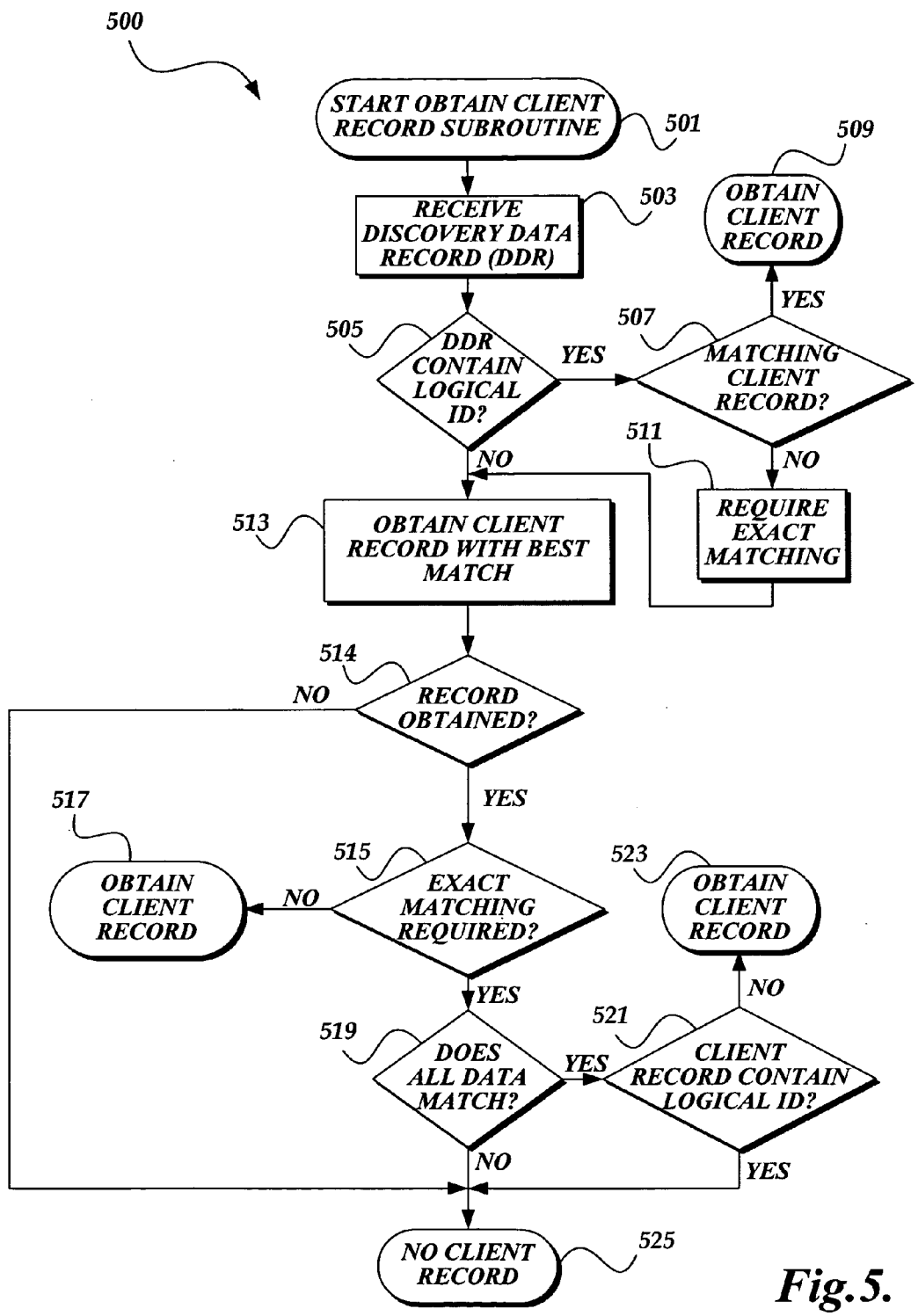
FIG. 5 is a block diagram of an obtain client record subroutine, for obtaining client records, in accordance with an embodiment of the present invention.

FIG. 3 is a flow diagram illustrating the process of creating a discovery data record, in accordance with an embodiment of the present invention. FIGS. 3-5 illustrate different routines that may be implemented according to embodiments of the present invention. FIGS. 3-5 illustrate blocks for performing specific functions. In alternative embodiments, more or fewer blocks may be used. In an embodiment of the present invention, a block may represent a software program, a software object, a software function, a software subroutine, a software method, a software instance, a code fragment, a hardware operation, or a user operation, singly or in combination.

Referring back to FIG. 3, the create discovery data record routine 300 begins at block 301 and at block 303 a client computing device is searched for a stored logical ID and stored hardware properties. In an embodiment of the present invention, the create discovery routine 300 may be performed by a CID on a client computing device. A logical ID and hardware properties may be stored on a computing device if that computing device is already a client of the discovery data manager. For example, as mentioned above, upon initialization of a CID within a networked computing environment, a unique logical ID is generated for the client computing device on which that CID is located. That logical ID is stored on the client computing device. Additionally, hardware properties at the time of creation of the logical ID are also determined and stored on the client computing device.

At decision block 305, it is determined whether the CID was able to locate a stored logical ID. If it is determined at decision block 305 that there was no stored logical ID, at block 307 a unique logical ID for that particular client computing device is created. That logical ID is then stored on the client computing device. Additionally, the hardware properties for the client computing device are determined and stored on the client computing device, as illustrated by block 309. At block 311, utilizing the determined hardware properties, a hardware ID is created and stored on the client computing device. The hardware ID, as mentioned above, is a unique hardware identifier for a particular item of hardware present on the client computing device. In an alternative embodiment, the hardware ID may be created by a combination of hardware identifiers of the client computing device. For example, the system BIOS and the MAC address of the client computing device may be merged to create a hardware ID.

Referring back to decision block 305, if it is determined that an existing logical ID does exist on the client computing device, at decision block 313 it is determined whether the stored hardware properties on the client computing device are similar to the existing hardware properties of the client computing device. Determining if the stored hardware properties are similar to the existing hardware properties provides the ability for the routine to allow for some changes in the hardware of the client computing device and still be able to accurately identify the client computing device with continued use of the stored logical ID. If it is determined at decision block 313 that the stored hardware properties are not similar to the existing hardware properties, at block 317 a new logical ID is created for the client computing device and stored on the client computing device. Additionally, at block 319, the existing hardware properties are also stored on the client computing device. At block 321, a hardware ID is created and stored on the client computing device. At block 323, the create discovery data record routine 300 generates a discovery data record that includes the newly created logical ID (block 317), the previous logical ID that was identified at decision block 305, the hardware ID created at block 321, and additional data, including key data, about the client computing device and the CID. That discovery data record is transmitted to the discovery data manager.

Referring back to decision block 313, if it is determined that the stored hardware properties are similar to the existing hardware properties, at block 315 a discovery data record is generated using the stored logical ID and the stored hardware ID. The create discovery data record routine 300 completes at block 325.

FIG. 4 is a block diagram illustrating an identify client computing device routine for accurately identifying a client computing device within a networked computing environment, in accordance with an embodiment of the present invention. In an embodiment of the present invention, the identify client computing device routine 400 is performed by a discovery data manager in response to receiving a discovery data record.

The identify client computing device routine 400 begins at block 401 and at block 403 a discovery data record is received. In response to receiving a discovery data record, at block 405 a client records database is queried for a matching non-obsolete client record. In an embodiment of the present invention, the client records database is queried for a matching non-obsolete client record by querying the client records for a logical ID that matches the logical ID contained in the received discovery data record. The subroutine for obtaining a non-obsolete client record from the client records database is described in more detail with respect to FIG. 5.

At decision block 407 it is determined whether a client record was obtained from the client records database. If it is determined at decision block 407 that a client record was obtained from the client records database, at block 409 the matching client record is compared to the received discovery data record and any additional or different data contained in the received discovery data record that is not included in the matching client record is updated for that client record.

Referring back to decision block 407, if it is determined that a matching client record is not obtained from the client records database, at block 411 all non-obsolete client records within the client records database that have the same hardware ID as the hardware ID in the received discovery data record are marked as obsolete. In an alternative embodiment, prior to marking all non-obsolete records with the same hardware ID as obsolete, it may be determined if there is more than one non-obsolete record in the database that has the same hardware ID. In such an embodiment, if there is more than one non-obsolete matching record, then the hardware ID generation may have failed and thus, none of the non-obsolete records are marked obsolete. However, if there is only one non-obsolete record identified as having a matching hardware ID, it is marked as obsolete, as illustrated by block 411.

At decision block 413 it is determined whether the received discovery data record contains a previous logical ID. If it is determined that the received discovery data record does contain a previous logical ID, at block 415 all non-obsolete client records that include a logical ID that matches the previous logical ID are marked as obsolete. Marking a non-obsolete record as obsolete indicates that the client record no longer represents a current client of the discovery data manager.

If it is determined at decision block 413 that the received discovery data record does not contain a previous logical ID, or after the client records have been marked obsolete (block 415), at block 417 a new client record is generated that includes the information contained in the received discovery data record. In particular, the new client record includes the received logical ID, hardware ID, and additional data contained within the received discovery data record.

At decision block 419 a determination is made as to whether the received discovery data record was received from a client of the network. As mentioned above, discovery data records may be generated to identify computing devices within the networked computing environment that do not contain a CID. It may be determined that the discovery data record was not received from a client if there is no logical ID included in the received discovery data record. In another example, additional data, such as the client version, or a client bit may be reviewed to determine if the received discovery data record was from a client.

If it is determined at decision block 419 that the discovery data record was received from a client, that record is set to active thereby indicating to the routine 400 that the client computing device associated with that client record is an active client of the networked computing environment, as illustrated by block 421. If it is determined at decision block 419 that the received discovery data record was not from a client computing device, or after the record has been set as active at block 431, the routine 400 ends at block 423.

FIG. 5 is a block diagram of an obtain client record subroutine 500 for obtaining non-obsolete client records, in accordance with an embodiment of the present invention. FIG. 5 describes in more detail the routine of obtaining a non-obsolete client record from a client records database referred to above as block 405 (FIG. 4). The obtain non-obsolete client record subroutine 500 begins at block 501 and at block 503 a discovery data record is received. At decision block 505 a determination is made as to whether the received discovery data record contains a logical ID. If it is determined at decision block 505 that the received discovery data record contains a logical ID, at decision block 507 a determination is made as to whether there is a matching non-obsolete client record contained within a client records database that includes the same logical ID. If it is determined at decision block 507 that there is a matching non-obsolete client record, at block 509 that record is obtained and the subroutine completes.

However, if it is determined at decision block 507 that there is no matching non-obsolete client record that has the same logical ID, at block 511 the subroutine 500 requires exact matching of key data contained in the client records with the key data contained in the received discovery data record. Upon setting the subroutine 500 to requiring exact matching it proceeds to block 513. Alternatively, if it is determined at decision block 505 that the received discovery data record does not contain a logical ID the subroutine 500 proceeds to block 513.

At block 513, the subroutine 500 identifies a non-obsolete client record from within the client records database that contains the highest amount of matching data with the data of the received discovery data record. If there is more than one non-obsolete client record with the same amount of matching data, the most recent record is obtained. At decision block 514 it is determined whether a record was obtained. If no record was obtained, the subroutine completes and no record is returned, as illustrated by block 525. A record may not be obtained if there are no non-obsolete records with data that matches the received discovery data record. If it is determined at decision block 514 that a record was obtained, at decision block 515, a determination is made as to whether the obtain non-obsolete client record subroutine 500 requires that the key data of the client record exactly match the key data of the received discovery data record. If it is determined at decision block 515 that exact matching is not required, at block 517 the non-obsolete client record is obtained and the subroutine completes.

However, if it is determined at decision block 515 that the subroutine 500 requires exact matching of key data, at decision block 519 a determination is made as to whether all the key data of the received discovery data record matches the key data of the client record. If it is determined at decision block 519 that all the key data does exactly match, at decision block 521 a determination is made as to whether the client record contains a logical identification. If it is determined at decision block 521 that the client record does not contain a logical identification, the record is obtained at block 523 and the subroutine completes. However, if it is determined at decision block 521 that the client record does contain a logical identification, then there is a potential that the client record should not be associated with the received discovery data record. Thus, the client record is not obtained and no record is returned, as illustrated by block 525. Additionally, if it is determined at decision block 519 that all the key data does not match, at block 525 no client record is returned and the subroutine completes.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method, implemented at a computer system that includes one or more processors, for identifying a client computing device in an asset management application, comprising:

receiving, at a discovery data manager, a discovery data record transmitted by the client computing device, the discovery data record including: (i) a hardware identification representing a physical identity of the client computing device and comprising a deterministic value that identifies hardware of the client computing device, and (ii) a logical identification representing a logical identity of the client computing device and comprising a random value that represents a unique installation of a client identification module at the client computing device, the hardware identification and the logical identification having been generated by the client identification module, which is configured to:

deterministically generate the hardware identification based on one or more properties of one or more hardware components of the client computing device, and to re-generate the hardware identification when the one or more hardware components change at the client computing device; and randomly generate the logical identification upon installation of the client identification module at the client computing device when a logical identification does not already exist for the client computing device, and to generate a new logical identification when one or more of the following occur: (i) the client identification module detects that it has been transferred to a different client computing device, or (ii) the client identification module detects that the one or more hardware components have changed at the client computing device;

maintaining, by the discovery data manager, a store of client records comprising a plurality of previously received discovery data records, the store of client records representing the identities of a plurality of client computing devices that are managed by the asset management application;

querying, by the discovery data manager, the store of client records for a client record corresponding to the received discovery data record to locate the identity of the client computing device;

identifying, by the discovery data manager, a client record in the store that includes a corresponding hardware identifier that matches the hardware identification of the received discovery data record, but that includes a corresponding logical identification that does not match the logical identification of the received discovery data record;

marking, by the discovery data manager, the identified client record with the matching hardware identification as obsolete based on the corresponding logical identification of the client record not matching the logical identification of the received discovery data record;

generating, by the discovery data manager, a new client record in the store that includes the hardware identification and the logical identification of the received discovery data record; and after identifying the client computing device, the discovery data manager using the hardware identification and logical identification of the new client record to query the client computing device for hardware components located on the client computer device, and software installed on the client computing device, and receiving a new discovery data record from the client computing device.

2. The method of claim 1, wherein the hardware identification is based on a serial number on a Basic Input/Output System of the client computing device.

3. The method of claim 1, wherein the hardware identification is based on a Media Access Control address of the client computing device.

4. The method of claim 1, wherein the hardware identification is based on an asset tag of the client computing device.

5. The method of claim 1, wherein the hardware identification is based on a combination of a plurality of hardware identifiers.

6. The method of claim 1, wherein the logical identification is a randomly generated number.

7. The method of claim 1, wherein the logical identification can be changed.

8. The method of claim 7, wherein the logical identification is changed in response to reinstalling an operating system of the client computing device.

9. The method of claim 7, wherein the logical identification is changed in response to changing a hardware component in the client computing device.

10. The method of claim 7, wherein the logical identification can be changed by a user of the client computing device.

11. The method of claim 1, wherein querying the plurality of client records for a client record corresponding to the received discovery data record includes, comparing the logical identification of the received discovery data record with a logical identification for each of the client records maintained in the store of client records.

12. The method of claim 11, wherein comparing the corresponding client record with the received discovery data record includes determining whether the hardware identification of the received discovery data record matches a hardware identification of the corresponding client record.

13. The method of claim 1, further comprising:
when a corresponding client record is identified in the results of the query, updating the corresponding client record to include additional information contained in the received discovery data record.

14. The method of claim 13, wherein updating the corresponding client record includes, updating the hardware identification of the matching client record to include the received hardware identification.

15. The method of claim 1, wherein comparing the corresponding client record with the received discovery data record includes determining whether the received discovery data record includes a logical identification matching a logical identification of a previously received discovery data record; and in response to a determination that the received discovery data record includes a logical identification matching a logical identification of a previously received discovery data record, marking each of the plurality of client records that include a logical identification that matches the received logical identification as obsolete.

16. The method of claim 1, further comprising:
when a matching client record is not identified in the query, marking each of the plurality of client records that include a hardware identification that matches the hardware identification of the received discovery record as obsolete.

17. The method of claim 1, wherein comparing the corresponding client record with the received discovery data record includes determining whether the received discovery data record includes a logical identification matching a previously received logical identification; and in response to a determination that the received discovery data record includes a logical identification matching a previously received logical identification, marking each of the plurality of client records that include a previously received logical identification that matches the received logical identification as obsolete; and creating a new client record.

18. The method of claim 1, further comprising:
in response to comparing the corresponding client record with the received discovery data record, setting the corresponding client record to active.

19. The method of claim 1 wherein the discovery data record is created by the client identification module by performing the following acts:

searching the client computing device for an existing logical identification and stored hardware properties for the client computing device;

when existing logical identification and stored hardware properties are located on the client computing device, the client identification module determines whether the located stored hardware properties are similar to existing hardware properties; and when it is determined that the located stored hardware properties are similar to the existing hardware properties, the client identification module generates the discovery data record including the located logical identification and a hardware identification derived from the stored hardware properties.

20. The method of claim 19, further comprising:
when it is determined that the located stored hardware properties are not similar to the existing hardware properties:
creating a new logical identification;
creating a hardware identification derived from the existing hardware properties;
storing the new logical identification and the new hardware identification on the client computing device;
storing the existing hardware properties on the client computing device; and
generating a discovery data record including the new logical identification and the hardware identification.

21. The method of claim 20, wherein the generated discovery data record further includes the located logical identification in addition to the new logical identification.

22. The method of claim 19, further comprising:
when existing logical identification and stored hardware properties are not located on the client computing device;
creating a new logical identification;
creating a hardware identification derived from existing hardware properties;
storing the new logical identification and the hardware identification on the client computing device; and
generating a discovery data record including the new logical identification and the hardware identification.

23. The method of claim 1, wherein the discovery data record further includes a name of the client identification module that is installed on the client computing device, and wherein the method further comprises:
determining that the store of client records does not contain a client record having the same logical identification as the logical identification received in the discovery data record from the client computing device;
comparing the name of the client identification module included in the discovery data record to a name of a client identification module included in each of the client records in the store of client records; and
upon determining that a first client record contains a name of a client identification module that matches the name of the client identification module included in the discovery data record, identifying the client computing device using the first client record.

24. A physical computer storage device having stored thereon computer executable instructions which, when executed by a processor, perform a method comprising:
receiving, at a discovery data manager, a discovery data record transmitted by the client computing device that includes a first operating system, the discovery data record including: (i) a hardware identification representing a physical identity of the client computing device and comprising a deterministic value that identifies hardware of the client computing device, and (ii) a logical identification representing a logical identity of the client computing device and comprising a random value that represents a unique installation of a client identification module at the client computing device, the hardware identification and the logical identification having been generated by the client identification module, which is configured to:
deterministically generate the hardware identification based on one or more properties of one or more hardware components of the client computing device, and to re-generate the hardware identification when the one or more hardware components change at the client computing device; and
randomly generate the logical identification upon installation of the client identification module at the client computing device when a logical identification does not already exist for the client computing device, and to generate a new logical identification when one or more of the following occur: (i) the client identification module detects that it has been transferred to a different client computing device, or (ii) the client identification module detects that the one or more hardware components have changed at the client computing device;
maintaining, by the discovery data manager, a store of client records comprising a plurality of previously received discovery data records, the store of client records representing the identities of a plurality of client computing devices that are managed by the asset management application;
querying, by the discovery data manager, the store of client records for a client record corresponding to the received discovery data record to locate the identity of the client computing device;
when a client record is identified as corresponding to the received discovery data record in the results of the query, the discovery data manager comparing the corresponding client record with the received discovery data record to confirm the identity of the client computing device;
after identifying the client computing device, the discovery data manager using the identity of the client computing device to query the client computing device for hardware components located on the client computer device, and software installed on the client computing device; and
receiving, at the discovery data manager, a second discovery data record transmitted by the client computing device, wherein the second discovery data record includes the hardware identification of the client computing device and a second logical identification of the client computing device, wherein the second logical identification is generated in response to a new operating system being installed on the client computing device.

25. A computer system, comprising:
one or more processors; and
one or more computer-readable storage devices having stored thereon computer-executable instructions that, when executed by the one or more processors, cause the computer system to implement a method, comprising:
receiving, at a discovery data manager, a discovery data record transmitted by the client computing device, the discovery data record including: (i) a hardware identification representing a physical identity of the client computing device and comprising a deterministic value that identifies hardware of the client computing device, and (ii) a logical identification representing a logical identity of the client computing device and comprising a random value that represents a unique installation of a client identification module at the client computing device, the hardware identification and the logical identification having been generated by the client identification module, which is configured to:
deterministically generate the hardware identification based on one or more properties of one or more hardware components of the client computing device, and to re-generate the hardware identification when the one or more hardware components change at the client computing device; and
randomly generate the logical identification upon installation of the client identification module at the client computing device when a logical identification does not already exist for the client computing device, and to generate a new logical identification when one or more of the following occur: (i) the client identification module detects that it has been transferred to a different client computing device, or (ii) the client identification module detects that the one or more hardware components have changed at the client computing device;
maintaining, by the discovery data manager, a store of client records comprising a plurality of previously received discovery data records, the store of client records representing the identities of a plurality of client computing devices that are managed by the asset management application;

querying, by the discovery data manager, the store of client records for a client record corresponding to the received discovery data record to locate the identity of the client computing device;

identifying, by the discovery data manager, a client record in the store that includes a corresponding hardware identifier that matches the hardware identification of the received discovery data record, but that includes a corresponding logical identification that does not match the logical identification of the received discovery data record;

marking, by the discovery data manager, the identified client record with the matching hardware identification as obsolete based on the corresponding logical identification of the client record not matching the logical identification of the received discovery data record;

generating, by the discovery data manager, a new client record in the store that includes the hardware identification and the logical identification of the received discovery data record; and after identifying the client computing device, the discovery data manager using the hardware identification and logical identification of the new client record to query the client computing device for hardware components located on the client computer device, and software installed on the client computing device and receiving a new discovery data record from the client computing device.

26. The computer system of claim 25, wherein the hardware identification is based on a serial number on a Basic Input/Output System of the client computing device.

27. The computer system of claim 25, wherein the hardware identification is based on a Media Access Control address of the client computing device.

28. The computer system of claim 25, wherein the hardware identification is based on an asset tag of the client computing device.

29. The computer system of claim 25, wherein the hardware identification is based on a combination of a plurality of hardware identifiers.

30. The computer system of claim 25, wherein the logical identification is a randomly generated number.

31. The computer system of claim 25, wherein the logical identification can be changed.

32. The computer system of claim 31, wherein the logical identification is changed in response to reinstalling an operating system of the client computing device.

33. The computer system of claim 31, wherein the logical identification is changed in response to changing a hardware component in the client computing device.

34. The computer system of claim 31, wherein the logical identification can be changed by a user of the client computing device.

* * * * *